(12) United States Patent
Tsai et al.

(10) Patent No.: US 9,880,346 B2
(45) Date of Patent: Jan. 30, 2018

(54) LIGHT GUIDE PLATE AND BACK LIGHT MODULE HAVING THE SAME

(71) Applicant: AU Optronics Corporation, Hsin-Chu (TW)

(72) Inventors: Zong-Huei Tsai, Hsin-Chu (TW); Shau-Yu Tsai, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 187 days.

(21) Appl. No.: 14/805,030

(22) Filed: Jul. 21, 2015

(65) Prior Publication Data

US 2016/0054509 A1  Feb. 25, 2016

(30) Foreign Application Priority Data

Aug. 22, 2014  (TW) .................................. 103129052

(51) Int. Cl.
*F21V 8/00* (2006.01)
*F21V 7/22* (2006.01)

(52) U.S. Cl.
CPC .......... *G02B 6/0055* (2013.01); *G02B 6/0036* (2013.01); *G02B 6/0065* (2013.01)

(58) Field of Classification Search
CPC ... G02B 6/0036; G02B 6/0055; G02B 6/0065
See application file for complete search history.

(56) References Cited

U.S. PATENT DOCUMENTS

| 6,345,899 B1 * | 2/2002 | Ohkawa | G02B 6/0038 349/61 |
| 2007/0115206 A1 * | 5/2007 | Kanaya | G02B 5/223 345/31 |
| 2014/0029295 A1 | 1/2014 | Hsiao et al. | |

FOREIGN PATENT DOCUMENTS

| CN | 1797115 A | 7/2006 |
| TW | 200700834 | 1/2007 |
| TW | 200835973 | 9/2008 |
| TW | I341946 | 5/2011 |
| TW | I410680 | 5/2011 |
| TW | I413832 | 3/2012 |
| TW | 201219917 | 5/2012 |
| TW | I367894 | 7/2012 |
| TW | 201321808 | 6/2013 |
| TW | 201405211 A | 2/2014 |

OTHER PUBLICATIONS

Office Action issued in corresponding Taiwan patent application (No. 103129052) dated Oct. 12, 2015.

* cited by examiner

*Primary Examiner* — Anh Mai
*Assistant Examiner* — Nathaniel Lee
(74) *Attorney, Agent, or Firm* — McClure, Qualey & Rodack, LLP

(57) ABSTRACT

A light guide plate includes a light guide layer and a metal reflective layer. The light guide layer has a light emitting surface, a bottom surface and a light incident surface. The light incident surface is located between the light emitting surface and the bottom surface. The metal reflective layer is coated on the bottom surface of the light guide layer. Additionally, an average reflectance of the metal reflective layer for light in a wavelength range of 400 to 550 nanometers is greater than an average reflectance of the metal reflective layer for light in a wavelength range of 550 to 700 nanometers.

17 Claims, 2 Drawing Sheets

LIGHT GUIDE PLATE AND BACK LIGHT MODULE HAVING THE SAME

CROSS-REFERENCE TO RELATED APPLICATIONS

This non-provisional application claims priority under 35 U.S.C. § 119(a) on Patent Application Nos. 103129052 filed in Taiwan, R.O.C. on Aug. 22, 2014, the entire contents of which are hereby incorporated by reference.

BACKGROUND

Technical Field

The disclosure relates to a light guide plate and a back light module having the light guide plate. More particularly, the disclosure relates to a light guide plate comprising a metal reflective layer and a back light module comprising the light guide plate.

Background

With the development of technology, liquid crystal display (LCD) devices have been utilized for electronic products, such as notebooks, digital cameras or mobile phones. Since display panels do not have luminescence characteristics, which means the display panel cannot laminate by themselves, the LCD devices need to combine with certain light sources (such as back light modules) that are adapted to emit sufficient and uniform light. The back light modules can be distinguished into edge-lighting back light modules and bottom-lighting back light modules according to where the light sources are disposed. Generally speaking, the edge-lighting back light module comprises a light guide plate, a reflective sheet, a light source and a frame. The light guide plate is disposed upon the reflective sheet, the light source is disposed at a side of the light guide plate, and all of the light guide plate, the reflective sheet, and the light source are disposed within an accommodation space enclosed by the frame.

Generally speaking, the light guide plate is made of an optical glass material. However, the optical glass has a higher absorptivity for short-wavelength light. With the increment of the distance between an exit surface of the light guide plate and the light source, the quantity of the short-wavelength light which emitted from the exit surface of the light guide plate will be decreased due to the absorption of the short-wavelength light by the light guide plate made of the optical glass material. Accordingly, light colors of the lights will become more uneven for the back light module.

SUMMARY

One aspect of the disclosure provides a light guide plate which includes a light guide layer and a metal reflective layer. The light guide layer has a light emitting surface, a bottom surface and a light incident surface. The light emitting surface and the bottom surface are opposite to each other. The light incident surface is located between the light emitting surface and the bottom surface. The metal reflective layer is coated on the bottom surface of the light guide layer. Additionally, an average absorptivity of the light guide layer for light in a wavelength range of 400 to 550 nanometers is greater than an average absorptivity of the light guide layer for light in a wavelength range of 550 to 700 nanometers. Furthermore, an average reflectance of the metal reflective layer for the light in the wavelength range of 400 to 550 nanometers is greater than an average reflectance of the metal reflective layer for the light in the wavelength range of 550 to 700 nanometers.

One aspect of the disclosure provides a light guide plate which includes a light guide layer and a metal reflective layer. The light guide layer has a light emitting surface, a bottom surface and a light incident surface. The light emitting surface and the bottom surface are opposite to each other. The light incident surface is located between the light emitting surface and the bottom surface. The metal reflective layer is coated on the bottom surface of the light guide layer. An average absorptivity of the light guide layer for light in a wavelength range of 400 to 500 nanometers is greater than an average absorptivity of the light guide layer for light in a wavelength range of 500 to 600 nanometers. The average absorptivity of the light guide layer for the light in the wavelength range of 500 to 600 nanometers is greater than an average absorptivity of the light guide layer for light in a wavelength range of 600 to 700 nanometers. An average reflectance of the metal reflective layer for the light in the wavelength range of 400 to 500 nanometers is greater than an average reflectance of the metal reflective layer for the light in the wavelength range of 500 to 600 nanometers. The average reflectance of the metal reflective layer for the light in the wavelength range of 500 to 600 nanometers is greater than an average reflectance of the metal reflective layer for the light in the wavelength range of 600 to 700 nanometers.

One aspect of the disclosure provides a back light module which includes the said light guide plate and a light source. The light source is disposed at the light incident surface of the light guide layer.

BRIEF DESCRIPTION OF THE DRAWINGS

The disclosure will become more fully understood from the detailed description given herein-below and the accompanying drawings which are given by way of illustration only and thus are not limitative of the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
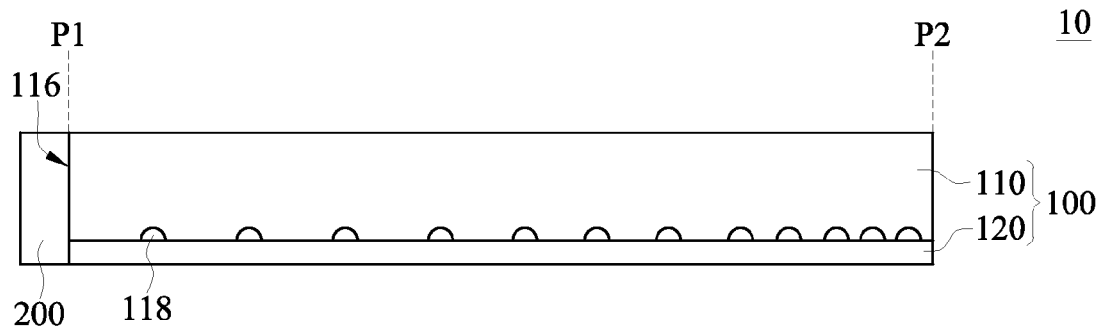
FIG. 1A is a cross-sectional view of a back light module according to an embodiment of the disclosure.
Figure 1B:
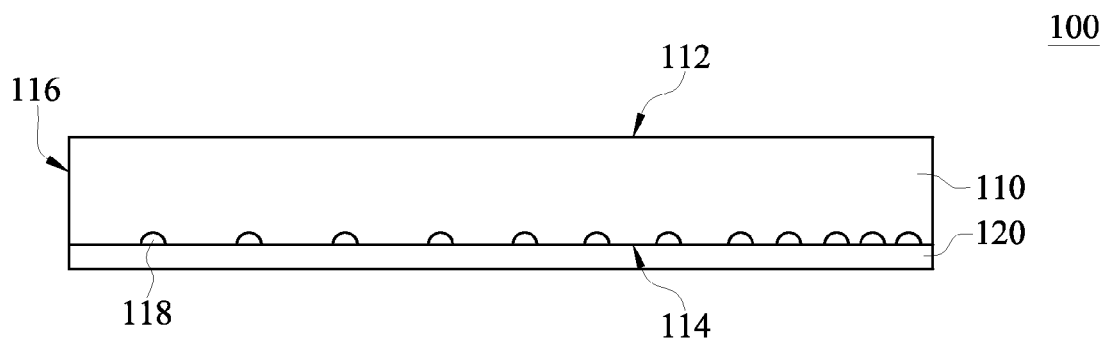
FIG. 1B is a cross-sectional view of a light guide plate of the back light module in FIG. 1A.
Figure 1C:
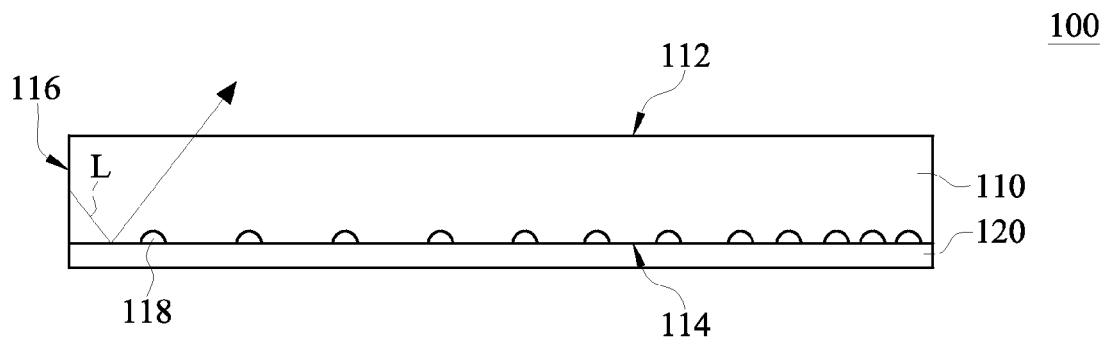
FIG. 1C shows an optical path diagram of light inside the back light module in FIG. 1B.

Please refer to FIG. 1A through FIG. 1C. FIG. 1A is a cross-sectional view of a back light module according to an embodiment of the disclosure. FIG. 1B is a cross-sectional view of a light guide plate of the back light module in FIG. 1A. FIG. 1C shows an optical path diagram of light inside the back light module in FIG. 1B. In this embodiment, the back light module 10 is an edge-type back light module 10.

The back light module 10 includes a light guide plate 100 and a light source 200. The light source 200 is disposed next to the light guide plate 100.

The light guide plate 100 includes a light guide layer 110 and a metal reflective layer 120. The light guide layer 110 has a light emitting surface 112, a bottom surface 114 and a light incident surface 116. The light emitting surface 112 and the bottom surface 114 are opposite to each other. The light incident surface 116 is located between the light emitting surface 112 and the bottom surface 114. In this embodiment, the light incident surface 116 faces the light source 200, and the two sides of the light incident surface 116 are connected with the light emitting surface 112 and the bottom surface 114, respectively. In this and some embodiments, the light guide layer 110 further includes a microstructure 118. The microstructure 118 is disposed on the bottom surface 114 of the light guide layer 110 where the light guide layer 110 is connected to the metal reflective layer 120. For example, the bottom surface 114 of the light guide layer 110 is distributed with a plurality of dots serving as the microstructure 118. The microstructure 118 is utilized for avoiding total reflections of the light guide layer 110, such that the output efficiency of the light emitting surface 112 is enhanced.

The metal reflective layer 120 is attached to the bottom surface 114 of the light guide plate 100. The metal reflective layer 120, for example, is coated on the bottom surface 114 by evaporation coating. However, the metal reflective layer 120 is not limited to being coated on the bottom surface 114 by evaporation coating. The light source 200 is disposed at the light incident surface 116 of the light guide plate 100. Accordingly, when light L emitted from the light source 200 enters the light guide layer 110 from the light incident surface 116, the light L is reflected by the metal reflective layer 120 at the bottom surface 114 if the light L reaches the bottom surface 114 of the light guide layer 110, and then the light L is emitted from the light emitting surface 112 of the light guide layer 110, as shown in FIG. 1C.

An average absorptivity of the light guide layer 110 for light in a wavelength range of 400 to 550 nanometers is greater than an average absorptivity of the light guide layer 110 for light in a wavelength range of 550 to 700 nanometers. In other words, when the light L enters the light guide layer 110 from the light incident surface 116, the average absorptivity of the light guide layer 110 for short wavelength light, such as in the wavelength range of 400 to 550 nanometers, is greater than the average absorptivity of the light guide layer 110 for long wavelength light, such as in the wavelength range of 550 to 700 nanometers. The material of the light guide layer 110, for example, is an optical glass, such that the light guide layer 110 absorbs more short wavelength light (such as blue ray). Accordingly, when an light emitting location of the light emitting surface 112 is farther away from the light source 200, the output ratio of the light L in the wavelength range of 400 to 550 nanometers is decreased, such that the light color of the light L becomes more uneven. For example, the light color of the light L becomes more red or yellow.

To improve the above problem of the light guide layer 110, an embodiment discloses that an average reflectance of the metal reflective layer 120 for light in the wavelength range of 400 to 550 nanometers is greater than an average reflectance of the metal reflective layer 120 for light in the wavelength range of 550 to 700 nanometers.

Accordingly, the short wavelength light (such as blue ray), which is absorbed by the light guide layer 110, is reflected, offset or compensated by the metal reflective layer 120, such that the light color of the light L emitted from the light guide plate 100 is more uniform.

Furthermore, in this and other embodiments, the average reflectance of the metal reflective layer 120 for the light L in the wavelength range of 400 to 550 nanometers is greater than the average reflectance of the metal reflective layer 120 for the light L in the wavelength range of 550 to 700 nanometers about 1% to 5%. Thus, the metal reflective layer 120 is utilized for improving the unevenness of the light color when the light guide layer 110 is the optical glass.

The materials of the metal reflective layer 120 will be described as follows. In this disclosure, the metal reflective layer 120 is made from silver, a first metal and a second metal. The silver is utilized for reflecting the light L which emits to the bottom surface 114, to avoid the light L leaving light guide layer 110 from the bottom surface 114, and further to improve the output efficiency of the light guide plate 100. Additionally, the first metal and the second metal are utilized for offsetting the light L in specific wavelengths absorbed by the light guide layer 110.

Figure 2A:
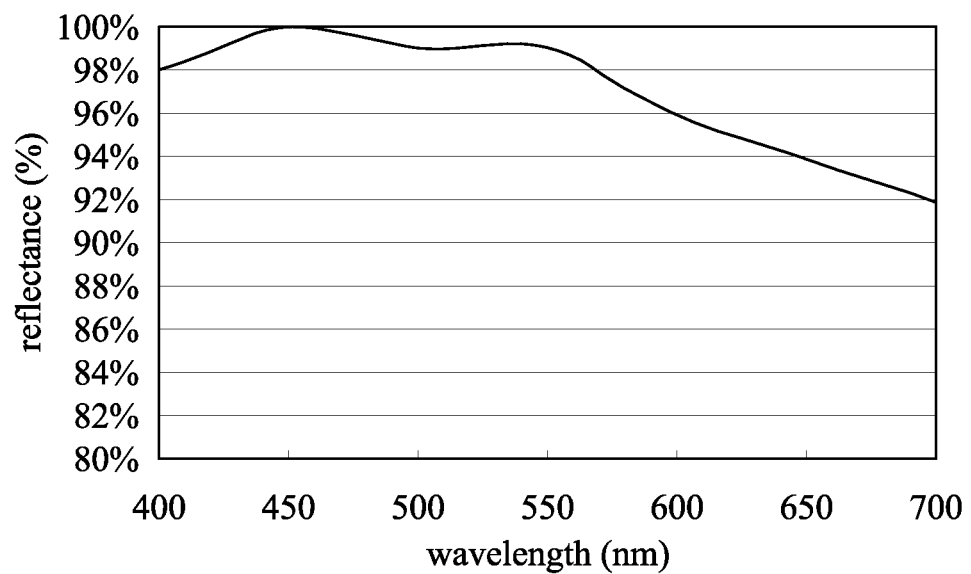
FIG. 2A is a graphical representation of wavelengths of the light vs. reflectance of vanadium.

The first metal is selected from the group consisting of vanadium (IV) and cobalt. The first metal, for example, is a blue metal, which is utilized for reflecting more short-wavelength light. Accordingly, an absorptivity of the first metal for light in the wavelength range of 400 to 550 nanometers is less than an absorptivity of the first metal for light in the wavelength range of 550 to 700 nanometers. That is to say, an average reflectance of the first metal for the light in the wavelength range of 400 to 550 nanometers is greater than an average reflectance of the first metal for the light in the wavelength range of 550 to 700 nanometers. Please refer to FIG. 2A, which is a graphical representation of wavelengths of the light vs. reflectance of vanadium. As shown in FIG. 2A, an average reflectance of the vanadium (IV) for the light in the wavelength range of 400 to 550 nanometers is greater than an average reflectance of the vanadium (IV) for the light in the wavelength range of 550 to 700 nanometers.

Figure 2B:
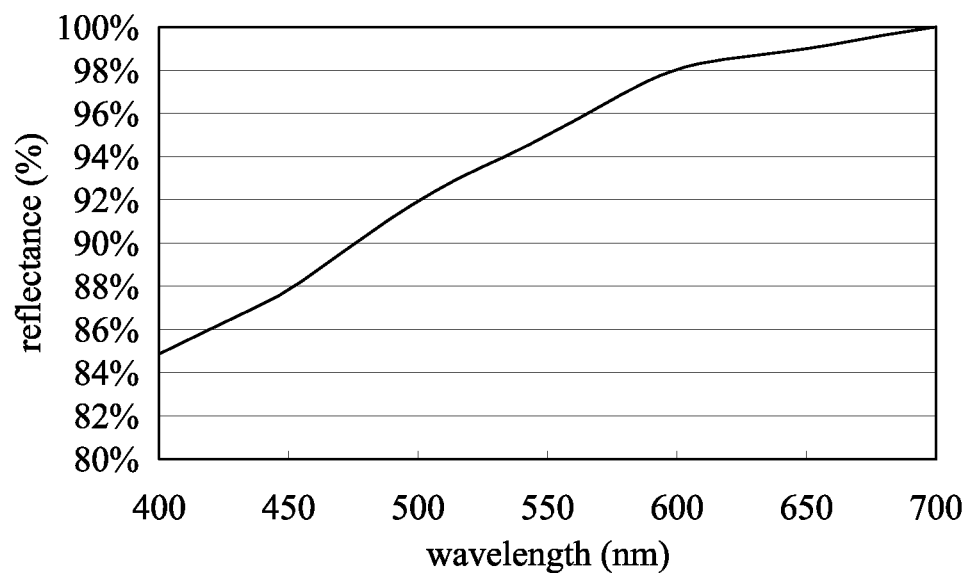
FIG. 2B is a graphical representation of wavelengths of the light vs. reflectance of manganese.

Additionally, the second metal is selected from the group consisting of manganese (II) and red bronze. The second metal, for example, is a red metal, which is utilized for reflecting more long-wavelength light. Accordingly, an absorptivity of the second metal doe light in the wavelength range of 400 to 550 nanometers is greater than an absorptivity of the second metal for light in the wavelength range of 550 to 700 nanometers. That is to say, an average reflectance of the second metal for the light in the wavelength range of 400 to 550 nanometers is less than an average reflectance of the second metal for the light in the wavelength range of 550 to 700 nanometers. Please refer to FIG. 2B, which is a graphical representation of wavelengths of the light vs. reflectance of manganese. As shown in FIG. 2B, an average reflectance of the manganese (II) for the light in the wavelength range of 400 to 550 nanometers is less than an average reflectance of the manganese (II) for the light in the wavelength range of 550 to 700 nanometers. Accordingly, the second metal is utilized for offsetting the long-wavelength light by preventing from reflecting too much short-wavelength light, for example, the blue light. In other words, the offset to the light is improved due to the proper ratio of combination of the first metal and the second metal.

The difference between the average reflectance of the metal reflective layer 120 for the light in the wavelength range of 400 to 550 nanometers and that for the light in the wavelength range of 550 to 700 corresponds to a ratio (i.e., (W1+W2)/W) of a sum (W1+W2) of the weight of the first metal (W1) and the weight of the second metal (W2) to a total weight of the metal reflective layer 120 (W). Additionally, the difference between the average reflectance of the metal reflective layer 120 for the light in the wavelength range of 400 to 550 nanometers and that for the light in the wavelength range of 550 to 700 also corresponds to a ratio (W1/W2) of the weight of the first metal (W1) to the weight of the second metal (W2). In this embodiment, the ratio of the sum of the weight of the first metal and the weight of the second metal to the total weight of the metal reflective layer 120 is between the 0.15% and 4%. The ratio of the weight of the first metal to the weight of the second metal is between 68:32 and 96:4. When the ratio of the weight of the first metal (W1) to the weight of the second metal (W2) is increased, the average reflectance of the metal reflective layer 120 for the short-wavelength light (in the wavelength range of 400 to 550 nanometers) is increased accordingly. When the ratio of the weight of the first metal to the weight of the second metal is decreased, the average reflectance of the metal reflective layer 120 for the long-wavelength light (in the wavelength range of 550 to 700 nanometers) is increased accordingly. In other words, the ratio (namely, (W1+W2)/W) of the sum of the weight of the first metal and the weight of the second metal to the total weight of the metal reflective layer 120, and the ratio (namely, W1/W2) of the weight of the first metal to the weight of the second metal can be adjusted by demand according to the materials of the light guide layer 110.

In this and some embodiments, an average reflectance of the metal reflective layer 120 for light in a wavelength range of 400 to 500 nanometers is greater than an average reflectance of the metal reflective layer 120 for light in a wavelength range of 500 to 600 nanometers. Moreover, an average reflectance of the metal reflective layer 120 for the light in the wavelength range of 500 to 600 nanometers is greater than an average reflectance of the metal reflective layer 120 for light in a wavelength range of 600 to 700 nanometers. In other words, the average reflectance of the metal reflective layer 120 is decreased corresponding to the increment of the wavelength range of the light.

In this and some embodiments, the average reflectance of the metal reflective layer 120 for the light in the wavelength range of 400 to 500 nanometers is greater than the average reflectance of the metal reflective layer 120 for the light in the wavelength range of 500 to 600 nanometers about 0.5% to 4%. Moreover, the average reflectance of the metal reflective layer 120 for the light in the wavelength range of 500 to 600 nanometers is greater than the average reflectance of the metal reflective layer 120 for the light in the wavelength range of 600 to 700 nanometers about 0.5% to 4%. Accordingly, the light color of the light guide plate 100 becomes more uniform.

The material and the optical characteristic of the light guide plate 100 according to a first embodiment are described in the following Table 1.

TABLE 1

| Material | | Light guide layer Polymethylmethacrylate (PMMA) |
|---|---|---|
| Average transmittance (%) | 400-550 (nm) | 95% |
| | 550-700 (nm) | 97.4% |
| Average transmittance (%) | 400-500 (nm) | 94.3% |
| | 500-600 (nm) | 97% |
| | 600-700 (nm) | 97.7% |

The material and the optical characteristic of the metal reflective layer 120 according to the first embodiment are described in the following Table 2.

TABLE 2

| | | Metal reflective layer |
|---|---|---|
| silver (%) | | 99.14% |
| vanadium (IV) (%) | | 0.697% |
| manganese (II) (%) | | 0.163% |
| Average reflectance (%) | 400-550 (nm) | 95.4% |
| | 550-700 (nm) | 93% |
| Average reflectance (%) | 400-500 (nm) | 96% |
| | 500-600 (nm) | 95.7% |
| | 600-700 (nm) | 93.3% |

The relationship between light emitting positions of the light guide plate 100 according to the first embodiment and a light guide plate according to a first comparative example and the XY-coordinates of each light guide plate in a CIE1931 color space are described in the following Table 3, in which position P1 is near the light source 200 and position P2 is away from the light source 200. The difference between the light guide plate 100 according to the first embodiment and the light guide plate according to the first comparative example is that the light guide plate according to the first comparative example does not have the metal reflective layer 120. In the first embodiment, the color difference is apparently decreased and hence uniformity of the light color is increased.

TABLE 3

| Distance | XY-coordinates of light guide plate at position P1 in the CIE1931 color space | XY-coordinates of light guide plate at position P2 in the CIE1931 color space | Color difference |
|---|---|---|---|
| first embodiment | (0.3024, 0.2911) | (0.3066, 0.2961) | dx = 0.0042 dy = 0.0050 |
| first comparative example | (0.3024, 0.2911) | (0.3122, 0.3105) | dx = 0.0098 dy = 0.0194 |

The material and the optical characteristic of the light guide plate 100 according to a second embodiment are described in the following Table 4.

TABLE 4

| Material | | Light guide layer PMMA |
|---|---|---|
| Average transmittance (%) | 400-550 (nm) | 96.6% |
| | 550-700 (nm) | 97.4% |
| Average transmittance (%) | 400-500 (nm) | 96.6% |
| | 500-600 (nm) | 97.1% |
| | 600-700 (nm) | 97.7% |

The material and the optical characteristic of the metal reflective layer 120 according to the second embodiment are described in the following Table 5.

TABLE 5

|  |  | Metal reflective layer |
|---|---|---|
| silver (%) |  | 99.43% |
| vanadium (IV) (%) |  | 0.497% |
| manganese (II) (%) |  | 0.073% |
| Average reflectance (%) | 400-550 (nm) | 99.34% |
|  | 550-700 (nm) | 97.37% |
| Average reflectance (%) | 400-500 (nm) | 97.37% |
|  | 500-600 (nm) | 96.4% |
|  | 600-700 (nm) | 95.3% |

The relationship of light emitting positions of the light guide plate 100 according to the second embodiment and a light guide plate according to a second comparative example and the XY-coordinates of each light guide plate in the CIE1931 color space are described in the Table 6. The difference between the light guide plate 100 according to the second embodiment and the light guide plate according to the second comparative example is that the light guide plate according to the second comparative example does not have the metal reflective layer 120.

TABLE 6

| Distance | XY-coordinates of light guide plate at position P1 in the CIE1931 color space | XY-coordinates of light guide plate at position P2 in the CIE1931 color space | Color difference |
|---|---|---|---|
| Second embodiment | (0.3024, 0.2911) | (0.3071, 0.2959) | dx = 0.0047<br>dy = 0.0048 |
| Second comparative example | (0.3024, 0.2911) | (0.3126, 0.3109) | dx = 0.0102<br>dy = 0.0198 |

As shown in above tables, in the disclosure, the metal reflective layer 120 is used for offsetting the short-wavelength light (blue light). Therefore, the problem that the light color of the light L emitted from the light guide plate 100 is uneven in prior art is significantly improved.

According to the light guide plate and the back light module having the same according to the embodiments of the disclosure, the light guide plate includes the metal reflective layer. The average reflectance of the metal reflective layer for the light in the wavelength range of 400 to 500 nanometers is greater than the average reflectance of the metal reflective layer for the light in the wavelength range of 500 to 600 nanometers. Furthermore, the average reflectance of the metal reflective layer for the light in the wavelength range of 500 to 600 nanometers is greater than the average reflectance of the metal reflective layer for the light in the wavelength range of 600 to 700 nanometers. Accordingly, the metal reflective layer is used for offsetting the short-wavelength light, such that the light color of the light becomes more uniform. Therefore, the problem that the light color of the light emitted from the light guide plate is uneven is significantly improved.

The disclosure will become more fully understood from the said embodiment for illustration only and thus does not limit the disclosure. Any modifications within the spirit and category of the disclosure fall in the scope of the disclosure.

What is claimed is:

1. A light guide plate, comprising:
    a light guide layer having a light emitting surface, a bottom surface and a light incident surface, the light emitting surface and the bottom surface being opposite to each other, the light incident surface being located between the light emitting surface and the bottom surface; and
    a metal reflective layer coated on the bottom surface of the light guide layer, wherein the metal reflective layer includes silver, a first metal and a second metal, the first metal is selected from the group consisting of vanadium (IV) and cobalt, and the second metal is selected from the group consisting of manganese (II) and red bronze;
    wherein an average absorptivity of the light guide layer for light in a wavelength range of 400 to 550 nanometers is greater than an average absorptivity of the light guide layer for light in a wavelength range of 550 to 700 nanometers, and an average reflectance of the metal reflective layer for the light in the wavelength range of 400 to 550 nanometers is greater than an average reflectance of the metal reflective layer for the light in the wavelength range of 550 to 700 nanometers.

2. The light guide plate according to claim 1, wherein a ratio of a weight of the first metal to a weight of the second metal is between 68:32 and 96:4.

3. The light guide plate according to claim 2, wherein a ratio of a sum of a weight of the first metal and a weight of the second metal to a total weight of the metal reflective layer is between 0.15% and 4%.

4. The light guide plate according to claim 1, wherein the average reflectance of the metal reflective layer for the light in the wavelength range of 400 to 550 nanometers is greater than the average reflectance of the metal reflective layer with the light in the wavelength range of 550 to 700 nanometers about 1% to 5%.

5. The light guide plate according to claim 1, wherein the light guide layer further comprises a microstructure disposed at the bottom surface of the light guide layer where the light guide layer is connected to the metal reflective layer.

6. A light guide plate, comprising:
    a light guide layer having a light emitting surface, a bottom surface and a light incident surface, the light emitting surface and the bottom surface being opposite to each other, the light incident surface being located between the light emitting surface and the bottom surface; and
    a metal reflective layer coated on the bottom surface of the light guide layer, wherein the metal reflective layer includes silver, a first metal and a second metal, the first metal is selected from the group consisting of vanadium (IV) and cobalt, and the second metal is selected from the group consisting of manganese (II) and red bronze;
    wherein an average absorptivity of the light guide layer for light in a wavelength range of 400 to 500 nanometers is greater than an average absorptivity of the light guide layer for light in a wavelength range of 500 to 600 nanometers, the average absorptivity of the light guide layer for the light in the wavelength range of 500 to 600 nanometers is greater than an average absorptivity of the light guide layer for light in a wavelength range of 600 to 700 nanometers, and an average reflectance of the metal reflective layer for the light in the wavelength range of 400 to 500 nanometers is greater than an average reflectance of the metal reflective layer for the light in the wavelength range of 500 to 600 nanometers, and the average reflectance of the metal reflective layer for the light in the wavelength range of 500 to 600 nanometers is greater than an average reflectance of the metal reflective layer for the light in the wavelength range of 600 to 700 nanometers.

7. The light guide plate according to claim 6, wherein the average reflectance of the metal reflective layer for the light in the wavelength range of 400 to 500 nanometers is greater than the average reflectance of the metal reflective layer for the light in the wavelength range of 500 to 600 nanometers about 0.5% to 4%.

8. The light guide plate according to claim 6, wherein the average reflectance of the metal reflective layer for the light in the wavelength range of 500 to 600 nanometers is greater than the average reflectance of the metal reflective layer for the light in the wavelength range of 600 to 700 nanometers about 0.5% to 4%.

9. The light guide plate according to claim 6, wherein the light guide layer further comprises a microstructure disposed at the bottom surface of the light guide layer where the light guide layer is connected to the metal reflective layer.

10. The light guide plate according to claim 6, wherein a ratio of a weight of the first metal to a weight of the second metal is between 68:32 and 96:4.

11. The light guide plate according to claim 10, wherein a ratio of a sum of a weight of the first metal and a weight of the second metal to a total weight of the metal reflective layer is between 0.15% and 4%.

12. A back light module, comprising:
a light guide plate, comprising:
 a light guide layer having a light emitting surface, a bottom surface and a light incident surface, the light emitting surface and the bottom surface being opposite to each other, the light incident surface being located between the light emitting surface and the bottom surface; and
a metal reflective layer coated on the bottom surface of the light guide layer, wherein the metal reflective layer includes silver, a first metal and a second metal, the first metal is selected from the group consisting of vanadium (IV) and cobalt, the second metal is selected from the group consisting of manganese (II) and red bronze, and an average reflectance of the metal reflective layer for short wavelength light is greater than an average reflectance of the metal reflective layer for long wavelength light; and
a light source disposed at the light incident surface of the light guide layer.

13. The back light module according to claim 12, wherein a ratio of a weight of the first metal to a weight of the second metal is between 68:32 and 96:4.

14. The back light module according to the claim 12, wherein an average reflectance of the metal reflective layer for light in a wavelength range of 400 to 550 nanometers is greater than an average reflectance of the metal reflective layer for light in a wavelength range of 550 to 700 nanometers.

15. The back light module according to the claim 14, wherein the average reflectance of the metal reflective layer for the light in the wavelength range of 400 to 550 nanometers is greater than the average reflectance of the metal reflective layer with the light in the wavelength range of 550 to 700 nanometers about 1% to 5%.

16. The back light module according to the claim 12, wherein an average reflectance of the metal reflective layer for light in a wavelength range of 400 to 500 nanometers is greater than an average reflectance of the metal reflective layer for light in a wavelength range of 500 to 600 nanometers, and the average reflectance of the metal reflective layer for the light in the wavelength range of 500 to 600 nanometers is greater than an average reflectance of the metal reflective layer for light in a wavelength range of 600 to 700 nanometers.

17. The back light module according to the claim 14, wherein the average reflectance of the metal reflective layer for the light hin the wavelength range of 400 to 500 nanometers is greater than the average reflectance of the metal reflective layer for the light in the wavelength range of 500 to 600 nanometers about 0.5% to 4%, and the average reflectance of the metal reflective layer for the light in the wavelength range of 500 to 600 nanometers is greater than the average reflectance of the metal reflective layer for the light in the wavelength range of 600 to 700 nanometers about 0.5% to 4%.

* * * * *